US008620393B2

(12) United States Patent
Bornstein et al.

(10) Patent No.: US 8,620,393 B2
(45) Date of Patent: Dec. 31, 2013

(54) OPTIMIZING BATTERY LIFE AND NETWORK RESOURCES DURING POSITION LOCATION TRACKING SCENARIO

(75) Inventors: Gilad Bornstein, Mark Shagal Haifa (IL); Alecsander Eitan, Haifa (IL); Nir Strauss, Yokneam Moshava (IL)

(73) Assignee: QUALCOMM Incorporated, San Diego, CA (US)

( * ) Notice: Subject to any disclaimer, the term of this patent is extended or adjusted under 35 U.S.C. 154(b) by 900 days.

(21) Appl. No.: 12/139,440

(22) Filed: Jun. 13, 2008

(65) Prior Publication Data

US 2009/0312032 A1 Dec. 17, 2009

(51) Int. Cl.
*H04M 1/00* (2006.01)

(52) U.S. Cl.
USPC .................. 455/574; 455/456.1; 342/357.74; 340/539.13; 340/573.4

(58) Field of Classification Search
USPC .............................................. 455/574, 456.1
See application file for complete search history.

(56) References Cited

U.S. PATENT DOCUMENTS 7,026,984 B1 4/2006 Thandu et al.
7,493,211 B2 2/2009 Breen
2002/0039904 A1* 4/2002 Anderson ..................... 455/456
2003/0148771 A1* 8/2003 de Verteuil .................... 455/456
2006/0256005 A1* 11/2006 Thandu et al. ........... 342/357.06
2008/0055154 A1* 3/2008 Martucci et al. ........... 342/357.1
2009/0009321 A1* 1/2009 McClellan et al. ...... 340/539.13
2009/0093958 A1* 4/2009 Wang et al. ................... 701/214

FOREIGN PATENT DOCUMENTS

JP 2008180582 A 8/2008
JP 2008544608 A 12/2008
WO WO 2009152472 A1 * 12/2009

OTHER PUBLICATIONS

International Search Report and Written Opinion—PCT/US2009/047266, International Search Authority—European Patent Office—Oct. 5, 2009.
Nico Deblauwe et al., "Combining GPS and GSM Cell-ID positioning for Proactive Location-based Services" Mobile and Ubiquitous Systems: Networking & Services, 2007. Mobiquitous 2007. Fourth Annual International Conference on, IEEE, Piscataway, NJ, USA, Aug. 6, 2007, pp. 1-7, XP031230267 ISBN: 978-1-4244-1024-8.
Taiwan Search Report—TW098119959—TIPO—Sep. 6, 2012.

* cited by examiner

*Primary Examiner* — Fayyaz Alam
*Assistant Examiner* — David Bilodeau
(74) *Attorney, Agent, or Firm* — Andrea L. Mays; Mary A. Fales

(57) ABSTRACT

An apparatus and method for optimizing battery life and network resources during position tracking is disclosed. The position of a target being tracked is compared with a predefined geofence boundary. If the position of the target is far from the geofence boundary, position fix of the target is calculated using low quality of service (QoS) parameters. If the position of the target is not far from the geofence boundary, position fix of the target is calculated using high quality of service (QoS) parameters.

35 Claims, 5 Drawing Sheets

OPTIMIZING BATTERY LIFE AND NETWORK RESOURCES DURING POSITION LOCATION TRACKING SCENARIO

FIELD

This disclosure relates generally to apparatus and methods for wireless tracking of people or assets. More particularly, the disclosure relates to optimizing battery life and network resources during position tracking such as in geofence.

BACKGROUND

Geofence tracking is the monitoring of movement of targets such as personal assets, vehicles or personnel within a defined geographic boundary. Geofence tracking is used to track and record the entry and exit of an assigned target (such as a vehicle) from a geographic boundary and to alert a user of the entry and/or exit activities of the assigned target.

A target's location within the geographic location may be established by position fixes. To obtain a highly accurate position fix, a mobile station device (e.g., portable device) may obtain SPS (Satellite Positioning System) pseudorange measurements and calculate its position relative to the geofence boundary. Alternatively, ground systems such as but not limited to Advanced Forward Link Trilateration (AFLT), Radio Frequency Identification (RFID), Bluetooth or Zigbee systems may be used. Achieving an accurate position fix using SPS pseudorange measurements requires the mobile station to perform complex calculations which can deplete the mobile station's battery power and use valuable network resources (e.g., geofence network resources, mobile station network resources, etc.). As used herein, SPS pseudorange measurements may be from a Global Positioning System (GPS), Galileo, Russian Global Navigation Satellite System (GLONASS), NAVSTAR, Global Navigation Satellite System (GNSS), a system that uses satellites from a combination of these systems, or any SPS developed in the future, each referred to generally herein as a Satellite Positioning System (SPS). As used herein, an SPS will also be understood to include analogous terrestrial ranging signal sources, such as pseudolites.

SUMMARY OF THE DISCLOSURE

Disclosed is an apparatus and method for optimizing battery life and network resources during position tracking. According to one aspect, a method for optimizing battery life and network resources during position tracking comprising defining a geofence center and a geofence boundary, receiving geofence network information associated with an area defined by the geofence boundary, obtaining mobile station network information, comparing the mobile station network information to the geofence network information, incrementing a skip counter if the mobile station network information is not within the geofence network information, comparing the skip counter to a maximum skip value; and, calculating a position fix using low quality of service parameters if the skip counter exceeds the maximum skip value.

In another aspect, a method for optimizing battery life and network resources during position tracking comprising defining a geofence center and a geofence boundary, receiving geofence network information associated with an area defined by the geofence boundary, obtaining mobile station network information, comparing the mobile station network information to the geofence network information, recovering a last real position fix if the mobile station network information is within the geofence network information, calculating a distance radius and referencing the distance radius to the last real position fix to define a circle, determining if the circle is far from the geofence boundary, and calculating a position fix using quality of service parameters.

In another aspect, a position tracking device comprises a processor with programmable instructions for defining a geofence center and a geofence boundary and for calculating a position fix, a receiving unit for receiving geofence network information associated with an area defined by the geofence boundary, and for receiving mobile station network information, and a comparator unit for comparing the mobile station network information to the geofence network information.

In another aspect, a computer-readable medium including program code stored thereon, comprising program code to define a geofence center and a geofence boundary, program code to receive geofence network information associated with an area defined by the geofence boundary, program code to obtain mobile station network information, program code to compare the mobile station network information to the geofence network information, program code to increment a skip counter if the mobile station network information is not within the geofence network information, program code to compare the skip counter to a maximum skip value, and program code to calculate a position fix using low quality of service parameters if the skip counter exceeds the maximum skip value.

In another aspect, a computer-readable medium including program code stored thereon, comprising program code to define a geofence center and a geofence boundary, program code to receive geofence network information associated with an area defined by the geofence boundary, program code to obtain mobile station network information, program code to compare the mobile station network information to the geofence network information, program code to recover a last real position fix if the mobile station network information is within the geofence network information, program code to calculate a distance radius and referencing the distance radius to the last real position fix to define a circle, program code to determine if the circle is far from the geofence boundary, and program code to calculate a position fix using quality of service parameters.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

The various illustrative logical blocks, modules, and circuits described herein may be implemented or performed with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof. The various illustrative logical blocks, modules, and circuits described herein may also include machine readable medium for storing software. The machine readable medium may also include one or more storage devices, a transmission line, or a carrier wave that encodes a data signal.

Figure 1:
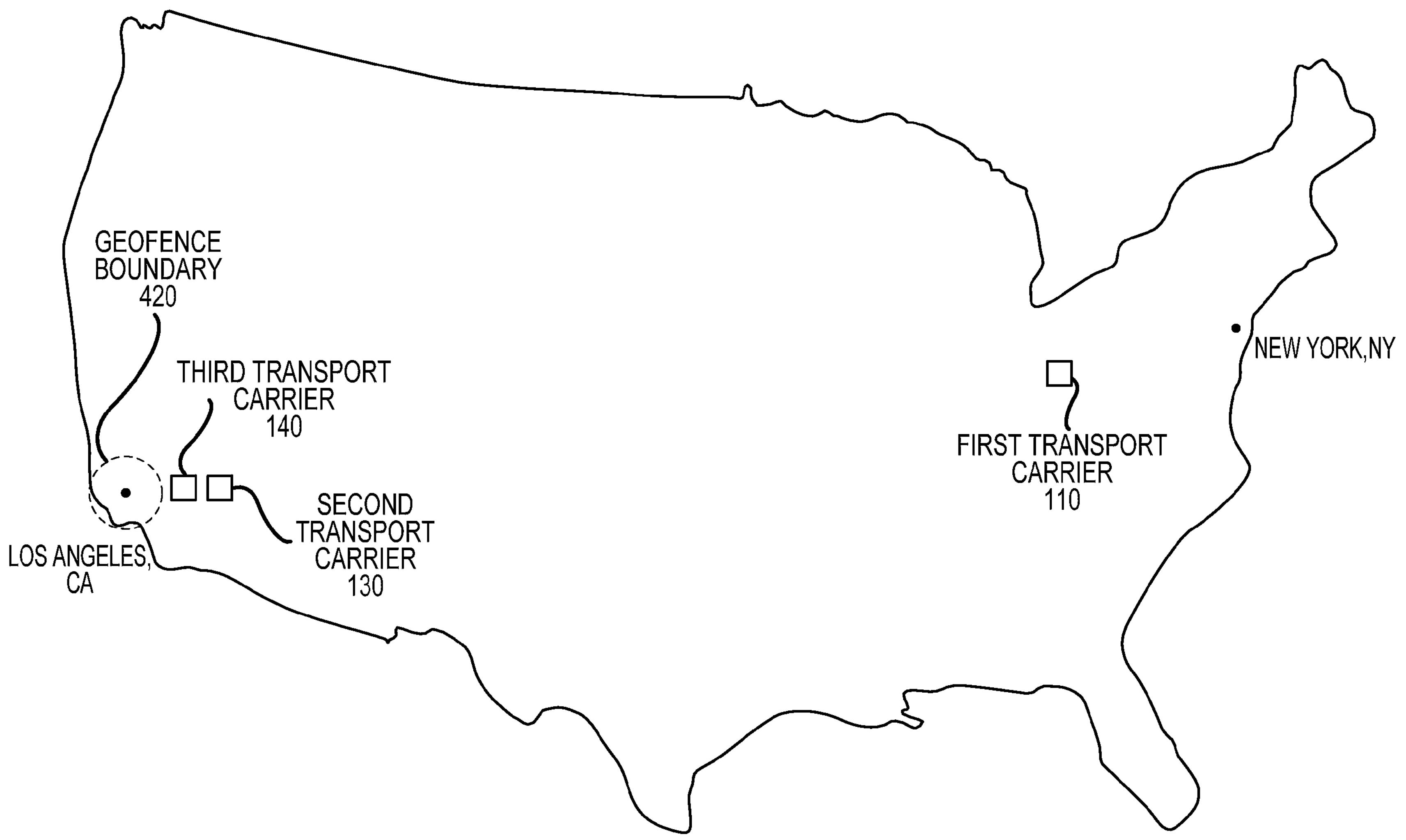
FIG. 1 is a geographic diagram illustrating an example situation where battery life and network resources can be optimized during position tracking.

FIG. 1 illustrates an example situation where battery life and network resources can be optimized during position tracking. FIG. 1 shows three transport carriers (first transport carrier 110, second transport carrier 130 and third transport carrier 140) delivering packages 111 (not shown) from New York, N.Y. to Los Angeles, Calif. The transport carriers may be delivering packages 111 for the United States Postal Service ("USPS") or another transport service. In one aspect, a user desires to track its package 111 to determine where the package 111 is and how soon the package 111 will be delivered. The user also desires to know with great accuracy when the package 111 has arrived within a predefined geofence boundary 420. In one example, the predefined geofence boundary 420 encompasses Los Angeles County. Here, there is no need for precise position location tracking while the first transport carrier 110 carrying package 111 is still traveling outside California. When the first transport carrier 110 is very far from Los Angeles County, the mobile station device 1000 may delay calculating a position fix using high quality of service (QoS) parameters for a specified time and instead, calculates a position fix using low QoS parameters. In one aspect, QoS refers to position determination accuracy and time-to-fix.

In the example, a second transport carrier 130 is closer to Los Angeles County than the first transport carrier 110, but it is still "far" from the geofence boundary 420. One skilled in the art would understand that the definition of "far" is dependent on the particular example and could involve parameters set by the user. Here, a position fix is calculated using low QoS parameters.

In the example, a third transport carrier 140 is closer to Los Angeles County than the second transport carrier 130. The third transport carrier 140 in FIG. 1 is "not far" from the geofence boundary 420. Here, calculating a position fix using low QoS parameters is inadequate to show the third transport carrier's 140 proximity to the geofence boundary 420. The third transport carrier's 140 position fix is calculated using high QoS parameters.

A position fix can be obtained in a variety of modes, including but not limited to, stand-alone Satellite Positioning Systems (SPS) with no ground system assistance; MS-based (Mobile Station-based) SPS with ground system assistance for initialization; MS-assisted (Mobile Station-assisted) with an external entity performing the position fix; AFLT (Advanced Forward Link Trilateration) based on code division multiple access (CDMA) sectors trilateration; hybrid based on SPS and CDMA sectors trilateration; and sector center based on sector location. SPS includes Global Positioning System (GPS), Galileo, GLONASS, NAVSTAR, GNSS and any system that uses satellites from a combination of these systems or any future developed satellite systems. As used herein, SPS will also be understood to include analogous terrestrial ranging signal sources such as pseudolites. One skilled in the art would understand that other modes, such as but not limited to inertial sensors, Mobile Switching Center (MSC) identification (ID), CDMA zone, roaming list, AFLT systems, RFID, Bluetooth, Zigbee, etc., for calculating the position fix are also available. Generally, SPS position fixes have high QoS (for example, higher-accuracy and shorter time-to-fix), but calculating position fixes using SPS requires more battery power and network resources from the mobile station device 1000. The alternative modes for calculating position fixes have low QoS (for example, lower-accuracy and longer time-to-fix) but require less battery power and network resources from the mobile station device 1000. In one aspect, high QoS parameters are obtained from SPS sources. In one aspect, high QoS parameters are obtained from non-SPS sources. In another aspect, low QoS parameters are obtained from non-SPS sources.

Figure 2:
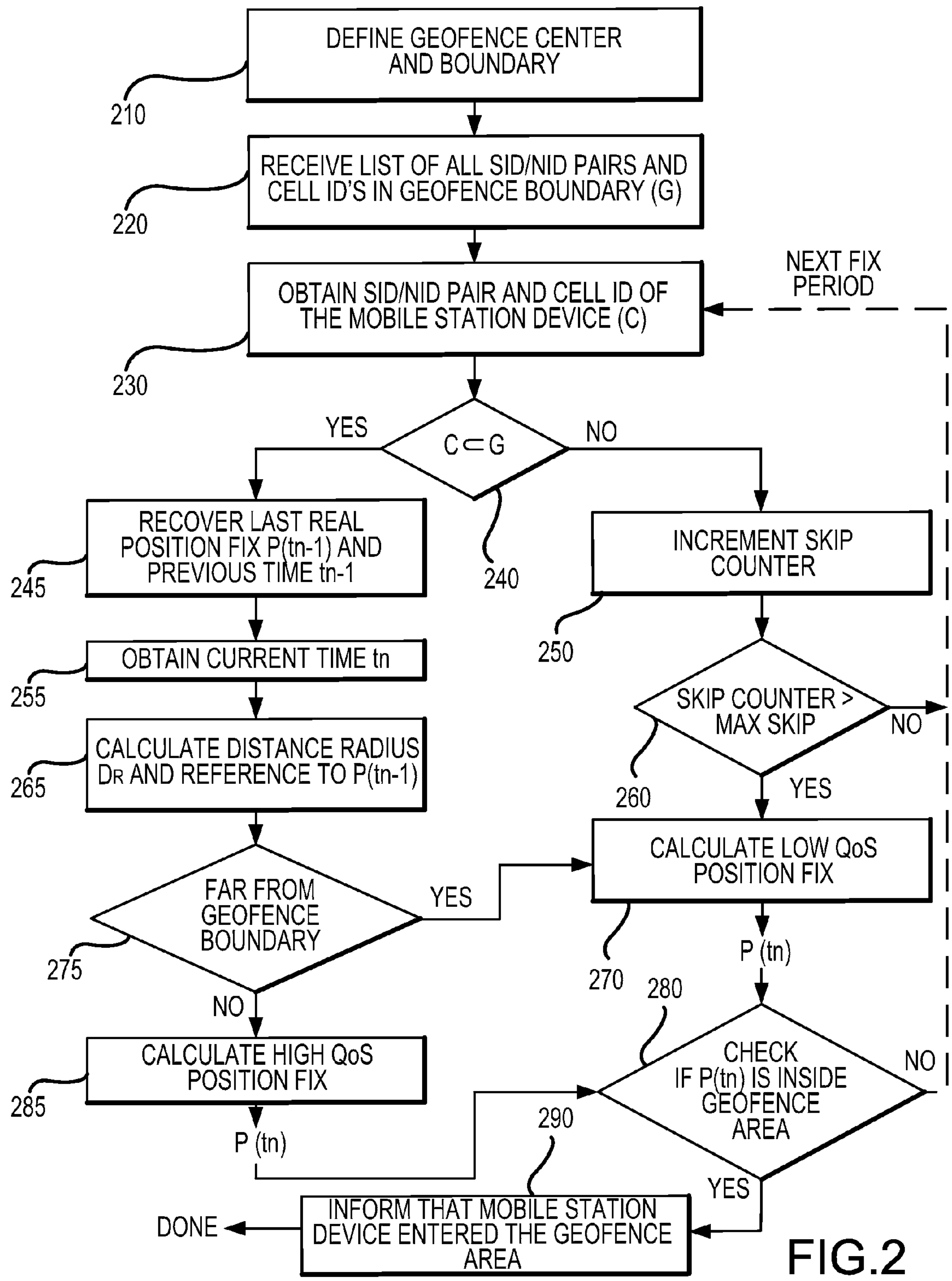
FIG. 2 is an exemplary flow diagram for optimizing battery life and network resources during position tracking.

FIG. 2 is an exemplary flow diagram for optimizing battery life and network resources during position tracking. One skilled in the art would understand that FIG. 2 presents an exemplary combination and ordering of the blocks. Various other combinations and orderings of the blocks presented in FIG. 2 will be readily apparent to those skilled in the art without departing from the spirit or scope of the disclosure.

Figure 3:
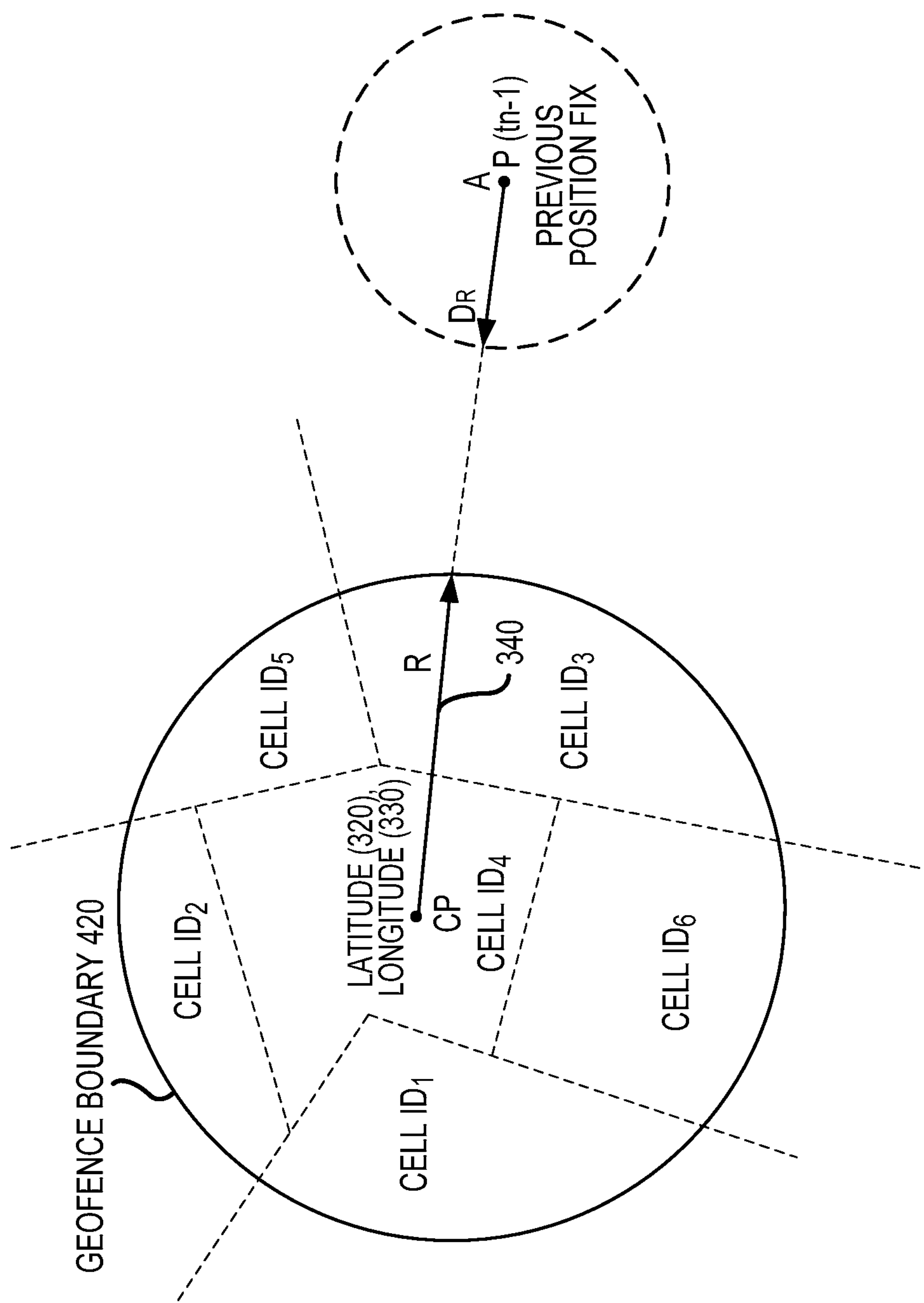
FIG. 3 illustrates an exemplary geofence center and boundary and an exemplary circle (area) created by $D_R$ with the last real position fix $P(t_{n-1})$.

In Block 210, the geofence center and geofence boundary 420 are defined. The mobile station device 1000 receives a latitude, longitude and radius to define the geofence center and boundary. The latitude, longitude and radius are all geofence system parameters that may be configured by the user, the operator or the application itself. FIG. 3 illustrates an exemplary geofence boundary 420 based on a latitude 320, a longitude 330 and a radius R 340. One of ordinary skill in the art would understand that these geofence system parameters may change depending on the needs of the user. More generally, one skilled in the art would understand that the geofence boundary 420 could be defined by a polygon with parameters defined by the user, operator and/or particular application.

In Block 220, the mobile station device 1000 receives a list of System ID/Network ID ("SID/NID") pairs and a list of cell identifications (Cell ID) associated with the SID/NID pairs (collectively labeled as geofence network information). FIG. 2 refers to the geofence SID/NID pairs and associated cell identifications as "G". The SID/NID pairs list may cover one or more operators. Each list size may be zero or more entries long. The SID/NID pairs and associated cell identifications specify the list of Sectors that cover the geofence area created by the center point CP (e.g., latitude, longitude) and radius R 340 in a predetermined geographical area. FIG. 3 illustrates cell identifications 1 through 6 intersecting an exemplary geofence boundary 420. Cell identification is a numerical identification associated with a cell within the geofence boundary 420.

In Block 230, the mobile station device 1000 obtains its current SID/NID pair and associated cell identification (collectively labeled as mobile station network information). FIG. 2 refers to this SID/NID pair and associated cell identification (mobile station network information) as "C". Without obtaining a position fix, the mobile station device 1000 is able to determine its cell identification and determine whether its cell identification is on the list of cell identifications in the geofence area covered by the geofence boundary 420.

In Block 240, the mobile station device 1000 checks to see whether its current SID/NID pair and associated cell identification is included in the geofence lists of SID/NID pairs and associated cell identifications. FIG. 2 refers to this determination as "$C \subset G$" (i.e., whether C is a proper subset of G).

In Block 240, if "C" is not included in "G", proceed to block 250. In block 250, a skip counter is incremented by one unit. The skip counter keeps count of the number of times the mobile station network information is not within the geofence network information.

In Block 260, the mobile station device 1000 determines whether the skip counter is greater than a predetermined threshold Max Skip (e.g., a maximum skip value). In one aspect, if the skip counter is less than or equal to a maximum skip value, the flow may loop back to Block 230 to obtain updated mobile station network information. Alternatively, in another aspect, the flow may discontinue and delay before reinitiating by returning to block 230 to obtain updated mobile station network information. Maximum skip value is a predetermined geofence system parameter that may be configured by the user, the operator or the application itself. In one example, the maximum skip value is configured according to the mobile station device's distance from the geofence boundary 420. One of ordinary skill in the art would understand that the maximum skip value may be configured to delay the mobile station device 1000 from obtaining a position fix. In one aspect, maximum skip value dynamically changes over time. In one aspect, if the skip counter is less than or equal to the maximum skip value, a position report is generated that the mobile station device 1000 is not within the geofence area covered by the geofence boundary 420, but is located within a geographical area covered by the mobile station device's current SID/NID pair and associated cell identification "C".

If the skip counter is greater than the maximum skip value, proceed to Block 270. In Block 270, the mobile station device 1000 calculates a low QoS ("Quality of Service") position fix, and provides an output $P(t_n)$. Obtaining a low QoS position fix instead of a high QoS position fix avoids depleting battery power and using up network resources. In one aspect, setting a maximum amount of times the mobile station device 1000 skips before obtaining a low QoS position fix is a safety measure and ensures that the mobile station device 1000 obtains at least some real position fixes.

In Block 240, if "C" is included in "G", proceed to block 245. In Block 245, "C" is included in "G". In Block 245, the last real position fix $P(t_{n-1})$ and previous time $t_{n-1}$ are recovered. The last real position fix $P(t_{n-1})$ is the position fix at previous time $t_{n-1}$.

In Block 255, the current time $t_n$ is obtained.

In Block 265, the distance radius $D_R$ is calculated using $V_n$, the maximum velocity of the asset being tracked and the time difference $(t_n-t_{n-1})$ between the current time $t_n$ and the previous time $t_{n-1}$. $V_n$ is inputted and is assumed to be known. $V_n$ is a geofence system parameter that is configured by the user, operator or the application itself. $D_R$ represents the boundary limits of the mobile station device's current location. $D_R$ is referenced to the last real position fix $P(t_{n-1})$. Accordingly, one of ordinary skill in the art would understand how to determine a geographical area (circle) representing the mobile station's current location. FIG. 3 illustrates an exemplary $D_R$ circle A created by $D_R$ 350 and the last real position fix $P(t_{n-1})$ 360.

In Block 275, the $D_R$ circle A is compared with the geofence boundary 420. The edge of the geofence boundary 420 is predetermined and is known. In Block 275, determine whether $D_R$ circle A is "far" from the geofence boundary 420. One of ordinary skill in the art will understand that the point on $D_R$ circle A closest to any given point on the geofence boundary 420 may be utilized to make this determination. One of ordinary skill in the art will also recognize that in some circumstances the point on $D_R$ circle A may be closest to more than one point on the geofence boundary 420.

Figure 4:
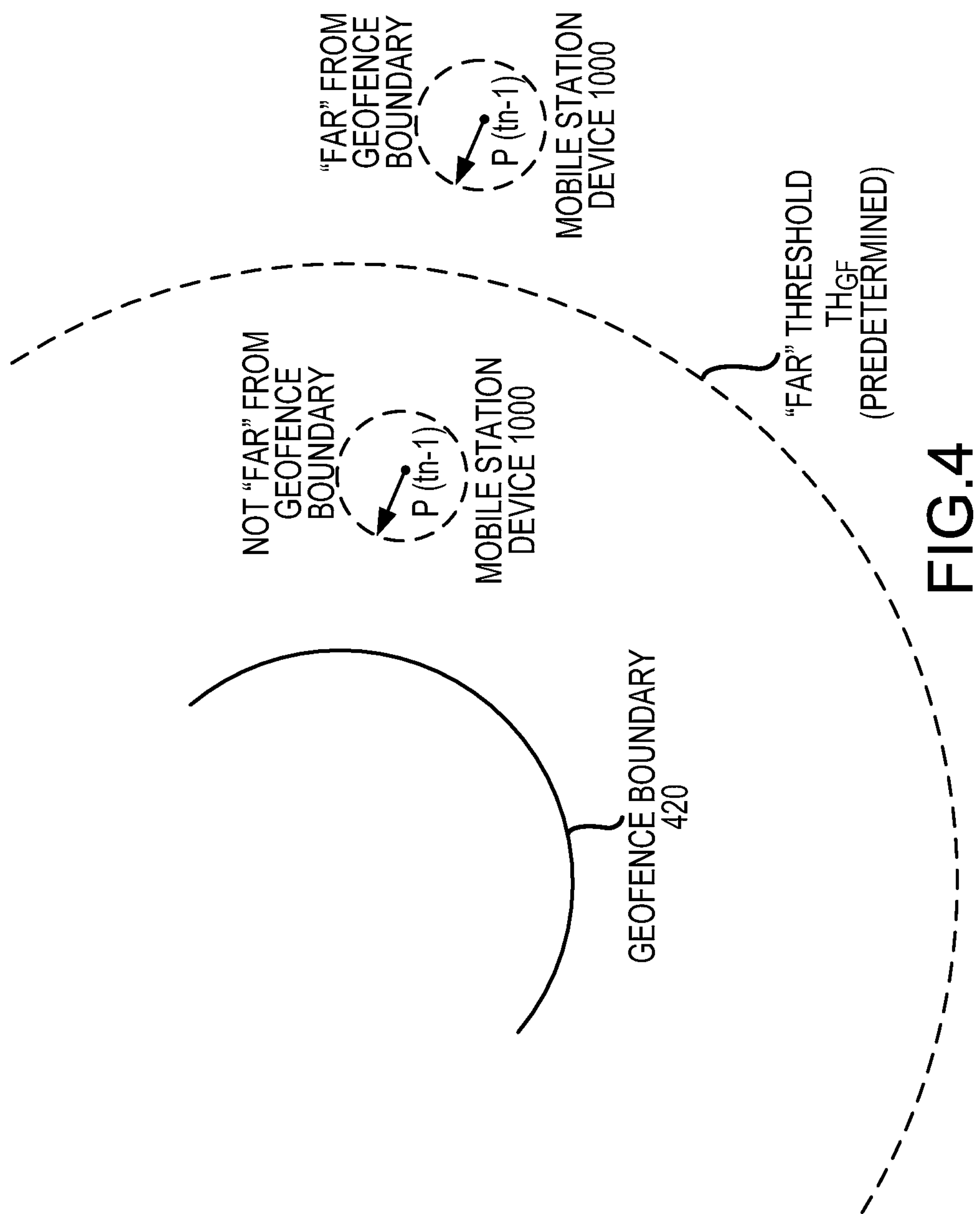
FIG. 4 illustrates an exemplary scenario in which the mobile station device determines if it is "far" from the geofence edge.

FIG. 4 shows a mobile station device 1000 in two locations. In one location, the mobile station device 1000 is "far" from the geofence boundary 420. In a second location, the mobile station device 1000 is not "far" from the geofence boundary 420. A predetermined geofence boundary threshold $Th_{GF}$ is used to determine whether or not circle A is "far" from the geofence boundary 420. The relative distance between the geofence boundary 420 and $D_R$ circle A determines whether a given $D_R$ circle A is "far" from the geofence edge. The definition of "far" and the predetermined geofence boundary threshold $Th_{GF}$ are decided by the user, operator or the application itself based on the particular geofence system and its parameters.

If the $D_R$ circle A is determined to be "far" from the geofence boundary in Block 275, proceed to Block 270. In Block 270, the mobile station device 1000 calculates a low QoS ("Quality of Service") position fix, and provides an output $P(t_n)$. Obtaining a low QoS position fix instead of a high QoS position fix avoids depleting battery power and using up network resources. In one aspect, following block 270, if a new position is to be determined, return to block 230 to obtain updated mobile network information.

If the $D_R$ circle A is determined to be not "far" from the geofence boundary in Block 275, proceed to Block 285. FIG. 4 shows the mobile station device 1000 in a second location which is not "far" from the geofence boundary 420. In Block 285, the mobile station device 1000 calculates a high QoS ("Quality of Service") position fix, and provides an output $P(t_n)$. A high degree of accuracy is necessary because the user needs to know an accurate proximity of the mobile station device 1000 to the geofence boundary 420. In one aspect, following block 285, if a new position is to be determined, return to block 230 to obtain updated mobile network information.

From block 285 or block 270, proceed to block 280 where it is determined if $P(t_n)$ is inside the geofence area (i.e., the area defined by the geofence boundary). If no (not inside), return to block 230. If yes (inside), proceed to block 290 to inform that the mobile station device 1000 has entered the geofence area.

Figure 5:
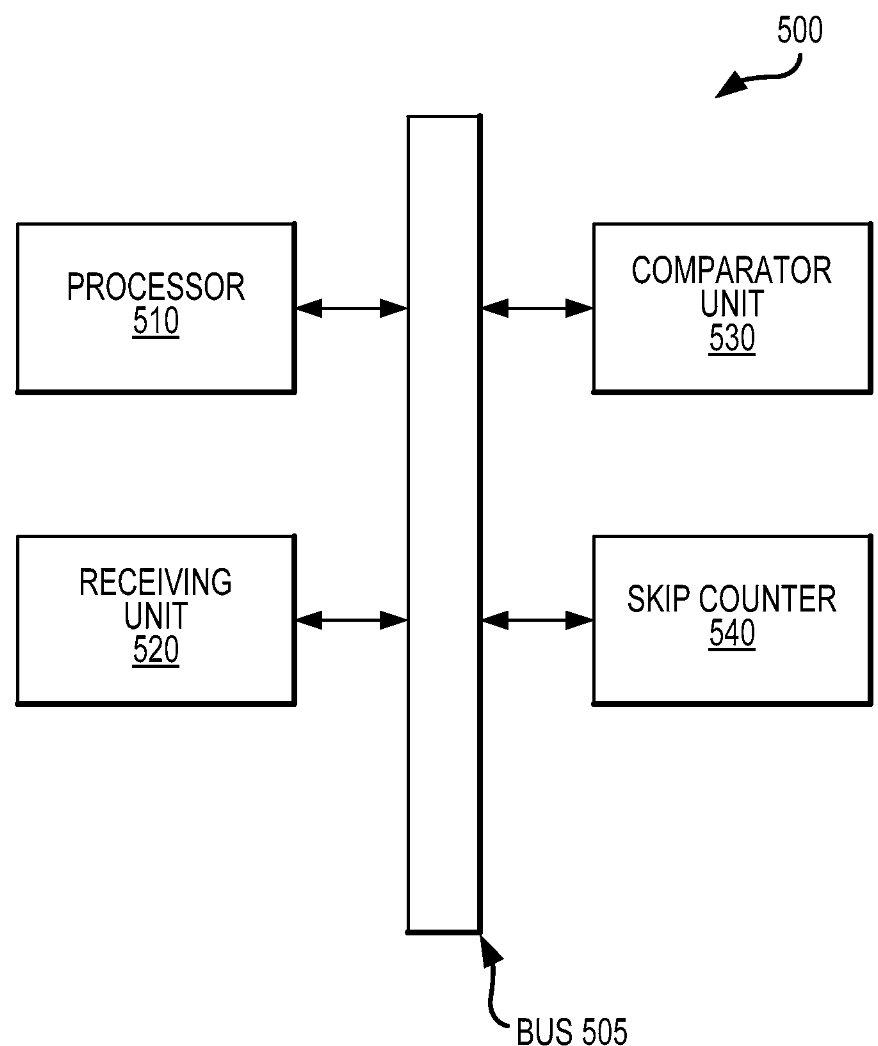
FIG. 5 illustrates one aspect of a position tracking device comprising a processor, receiving unit, comparator unit, and skip counter.

FIG. 5 shows one aspect of a position tracking device. In this aspect, the position tracking device 500 comprises a processor 510 with programmable instructions for defining a geofence center and a geofence boundary and for calculating a position fix. Additionally, the position tracking device 500 includes a receiving unit 520 for receiving geofence network information associated with an area defined by the geofence boundary, and for receiving mobile station network information. One skilled in the art would understand that that in one aspect, portions or the entire receiving unit 520 are part of the processor 510. In another aspect, the receiving unit 520 is a separate component from the processor 510. The position tracking device 500 includes a comparator unit 530 for comparing the mobile station network information to the geofence network information. One skilled in the art would understand that in one aspect, portions or the entire comparator unit 530 are part of the processor 510. In another aspect, the comparator unit 530 is a separate component from the processor 510. In one aspect, the position tracking device 500 includes a skip counter 540 to keep count of the number of times the mobile station network information is not within the geofence network information. In one aspect, the skip counter 540 may be housed within the processor 510. In another aspect, the skip counter 540 is a separate component from the processor 510. One skilled in the art would understand that the skip counter 540 may be implemented in hardware or in software.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method comprising:

defining a geofence center and a geofence boundary;

receiving geofence network information associated with an area defined by the geofence boundary;

obtaining mobile station network information;

determining whether the mobile station network information identifies a cell at least partially within the geofence boundary;

performing an operation when the mobile station network information does not identify a cell at least partially within the geofence boundary, the operation comprising:

incrementing a skip counter, wherein the skip counter is configured to count a number of times that the mobile station network information does not identify a cell at least partially within the geofence boundary;

determining whether the skip counter exceeds a threshold representative of a maximum number of consecutive times a mobile station device obtaining the mobile station network information is determined to not be at least partially within the geofence boundary before performing calculations to obtain a pseudorange-based low Quality of Service (QoS) position fix using a first set of parameters;

in response to determining that the skip counter does not exceed the threshold, performing a second operation; and in response to determining that the skip counter exceeds the threshold, performing operations to calculate a position fix using the first set of parameters.

2. The method of claim 1, further comprising outputting the position fix.

3. The method of claim 2, wherein the first set of parameters comprises non-satellite positioning system based pseudoranges.

4. The method of claim 1, wherein the first set of parameters comprises non-satellite positioning system based pseudoranges.

5. The method of claim 1, wherein the second operation comprises generating a position report.

6. The method of claim 1, wherein the second operation comprises:

obtaining updated mobile station network information; and determining whether the updated mobile station network information identifies a cell at least partially within the geofence boundary.

7. The method of claim 1, wherein the threshold is configurable.

8. The method of claim 7, wherein the mobile station network information relates to the mobile station device and wherein the threshold is configured based on a distance between the mobile station device and the geofence boundary.

9. The method of claim 1, further comprising determining if the position fix is within the area defined by the geofence boundary.

10. The method of claim 9, further comprising providing information that the position fix is within the area defined by the geofence boundary.

11. A method comprising:

defining a geofence center and a geofence boundary;

receiving geofence network information associated with an area defined by the geofence boundary;

obtaining mobile station network information associated with a mobile station device;

determining whether the mobile station network information identifies a cell at least partially within the geofence boundary;

in response to determining that the mobile station network information identifies a cell at least partially within the geofence boundary, retrieving a last real position fix of the mobile device and a time associated with the last real position fix;

calculating a distance radius based at least in part on the last real position fix and a distance the mobile station device is capable of traveling during a time period, wherein the time period is based on the time associated with the last real position fix;

defining a mobile station boundary that is centered at the last real position fix based on the distance radius, wherein the mobile station boundary represents a boundary limit of a location of the mobile station device, wherein the mobile station boundary is different from the geofence boundary;

determining whether the mobile station boundary is within a threshold distance from the geofence boundary;

calculating a position fix using quality of service parameters based on whether the mobile station boundary is within the threshold distance from the geofence boundary, wherein the quality of service parameters include one of a first set of parameters and a second set of parameters;

incrementing a skip counter value when the mobile station boundary is not within the threshold distance from the geofence boundary;

comparing the skip counter value with a pre-determined threshold value representative of a maximum number of consecutive times the mobile station device obtaining the mobile station network information is determined to not be at least partially within the geofence boundary before performing calculations to obtain a pseudorange-based low Quality of Service (QoS) position fix using the first set of parameters; and performing operations to obtain new mobile station network information when the skip counter value exceeds the pre-determined threshold.

12. The method of claim 11, wherein the quality of service parameters are the first set of parameters when the mobile station boundary is not within the threshold distance from the geofence boundary.

13. The method of claim 11, wherein the quality of service parameters are the second set of parameters when the mobile station boundary is within the threshold distance from the geofence boundary.

14. The method of claim 12, further comprising outputting the position fix.

15. The method of claim 13, further comprising outputting the position fix.

16. The method of claim 12, wherein the first set of parameters comprises non-satellite positioning system based pseudoranges.

17. The method of claim 12, wherein the first set of parameters comprises non-satellite positioning system based pseudoranges from at least one of inertial sensors, a mobile switching center identification, a code division multiple access zone, a roaming list, an advanced forward link trilateration, a radio frequency identification, Bluetooth information, and Zigbee system information.

18. The method of claim 13, wherein the second set of parameters comprises satellite positioning system based pseudoranges.

19. The method of claim 18, wherein at least one of the satellite positioning system based pseudoranges is from a pseudolite.

20. The method of claim 13, wherein the second set of parameters comprises non-satellite positioning system based pseudoranges.

21. The method of claim 11, further comprising determining if the position fix is within the area defined by the geofence boundary.

22. The method of claim 21, further comprising providing information that the position fix has entered the area defined by the geofence boundary.

23. A position tracking device comprising:
- a receiving unit for receiving geofence network information associated with an area defined by a geofence boundary and for receiving mobile station network information associated a mobile device;
- a comparator unit for determining whether the mobile station network information identifies a cell at least partially within the geofence boundary;
- a skip counter configured to count a number of times that the mobile station network information does not identify a cell at least partially within the geofence boundary, wherein the skip counter is incremented each time that the mobile station network information does not identify a cell at least partially within the geofence boundary; and
- a processor with programmable instructions for:
  - defining a geofence center and the geofence boundary;
  - calculating a position fix;
  - performing an operation when the skip counter does not exceed a threshold representative of a maximum number of consecutive times the position mobile device receiving the mobile station network information is determined to not be at least partially within the geofence boundary before performing calculations to obtain a pseudorange-based low Quality of Service (QoS) position fix; and
  - performing a second operation when the skip counter exceeds the threshold.

24. The position tracking device of claim 23, wherein the processor calculates the position fix using a first set of parameters.

25. The position tracking device of claim 23, wherein the programmable instructions include instructions for recovering a last real position fix when the mobile station network information identifies a cell at least partially within the geofence boundary.

26. The position tracking device of claim 25, wherein the programmable instructions include instructions for calculating a distance radius based on the last real position fix and a distance the mobile station device is capable of traveling during a time period and defining a mobile station boundary that is centered at the last real position fix, wherein the mobile station boundary represents a boundary limit of a location of a mobile station device, wherein the mobile station boundary is different from the geofence boundary.

27. The position tracking device of claim 26, wherein the programmable instructions include instructions for determining if the mobile station boundary is within a threshold distance from the geofence boundary.

28. The position tracking device of claim 27, wherein the processor calculates the position fix using a first set of parameters if the mobile station boundary is not within the threshold distance from the geofence boundary.

29. The position tracking device of claim 27, wherein the processor calculates the position fix using a second set of parameters if the mobile station boundary is within the threshold distance from the geofence boundary threshold.

30. A non-transitory computer-readable medium including program code stored thereon, comprising program code to:
- define a geofence center and a geofence boundary;
- receive geofence network information associated with an area defined by the geofence boundary;
- obtain mobile station network information associated with a mobile device;
- determine whether the mobile station network information identifies a cell at least partially within the geofence boundary;
- increment a skip counter in response to determining that the mobile station network information does not identify a cell at least partially within the geofence boundary, wherein the skip counter is configured to count a number of times that the mobile station network information does not identify a cell at least partially within the geofence boundary;
- determine whether the skip counter exceeds a threshold representative of a maximum number of consecutive times the mobile device obtaining the mobile station network information is determined to not be at least partially within the geofence boundary before performing calculations to obtain a pseudorange-based low Quality of Service (QoS) position fix using a first set of parameters;
- perform a second operation in response to the skip counter not exceeding the threshold; and
- perform operations to calculate a position fix using the first set of parameters in response to the skip counter exceeding the threshold.

31. A non-transitory computer-readable medium including program code stored thereon, comprising program code to:
- define a geofence center and a geofence boundary;
- receive geofence network information associated with an area defined by the geofence boundary;
- obtain mobile station network information associated with a mobile device;

determine whether the mobile station network information identifies a cell at least partially within the geofence boundary;

recover information associated with a last real position fix of the mobile station device when the mobile station network information identifies a cell at least partially within the geofence boundary;

calculate a distance radius based at least in part on the last real position fix and a distance the mobile station device is capable of traveling during a time period;

define a mobile station boundary that is centered at the last real position fix based at least in part on the distance radius, wherein the mobile station boundary represents a boundary limit of a location of a mobile station device, wherein the mobile station boundary is different from the geofence boundary;

determine whether the mobile station boundary is within a threshold distance from the geofence boundary;

calculate a position fix using quality of service parameters based on whether the mobile station boundary is within the threshold distance from the geofence boundary;

incrementing a skip counter value when the mobile station boundary is not within a threshold distance from the geofence boundary;

comparing the skip counter value with a pre-determined threshold value representative of a maximum number of consecutive times the mobile device obtaining the mobile station network information is determined to not be at least partially within the geofence boundary before performing calculations to obtain a pseudorange-based low Quality of Service (QoS) position fix; and performing operations to obtain new mobile station network information when the skip counter value exceeds the pre-determined threshold.

32. An apparatus comprising:

means for defining a geofence center and a geofence boundary;

means for receiving geofence network information associated with an area defined by the geofence boundary;

means for obtaining mobile station network information;

means for determining whether the mobile station network information identifies cell at least partially within the geofence boundary;

means for performing an operation when the mobile station network information does not identify a cell at least partially within the geofence boundary, the operation comprising:

incrementing a skip counter, wherein the skip counter is configured to count a number of times that the mobile station network information does not identify a cell at least partially within the geofence boundary;

determining whether the skip counter exceeds a threshold representative of a maximum number of consecutive times the apparatus obtaining the mobile station network information is determined to not be at least partially within the geofence boundary before performing calculations to obtain a pseudorange-based low Quality of Service (QoS) position fix using a first set of parameters;

in response to determining that the skip counter does not exceed the threshold, performing a second operation; and in response to determining that the skip counter exceeds the threshold, performing operations to calculate a position fix using the first set of parameters.

33. The apparatus of claim 32, further comprising means for outputting the position fix.

34. The apparatus of claim 33, wherein the first set of parameters comprises non-satellite positioning system based pseudoranges.

35. An apparatus comprising:

means for defining a geofence center and a geofence boundary;

means for receiving geofence network information associated with an area defined by the geofence boundary;

means for obtaining mobile station network information associated with a mobile station device;

means for determining whether the mobile station network information identifies a cell at least partially within the geofence boundary;

in response to determining that the mobile station network information identifies a cell at least partially within the geofence boundary, means for retrieving a last real position fix of the mobile device and a time associated with the last real position fix;

means for calculating a distance radius based at least in part on the last real position fix and a distance the mobile station device is capable of traveling during a time period, wherein the time period is based on the time associated with the last real position fix;

means for defining a mobile station boundary that is centered at the last real position fix based on the distance radius, wherein the mobile station boundary represents a boundary limit of a location of the mobile station device, wherein the mobile station boundary is different from the geofence boundary;

means for determining whether the mobile station boundary is within a threshold distance from the geofence boundary;

means for calculating a position fix using quality of service parameters based on whether the mobile station boundary is within the threshold distance from the geofence boundary, wherein the quality of service parameters include one of a first set of parameters and a second set of parameters;

means for incrementing a skip counter value when the mobile station boundary is not within a threshold distance from the geofence boundary;

means for comparing the skip counter value with a pre-determined threshold value representative of a maximum number of consecutive times the mobile station device obtaining the mobile station network information is determined to not be at least partially within the geofence boundary before performing calculations to obtain a pseudorange-based low Quality of Service (QoS) position fix using the first set of parameters; and means for performing operations to obtain new mobile station network information when the skip counter value exceeds the pre-determined threshold.

* * * * *